United States Patent
Pober et al.

(10) Patent No.: US 10,119,062 B2
(45) Date of Patent: Nov. 6, 2018

(54) INVERT EMULSION TREATMENT FLUIDS COMPRISING POLAR ORGANIC COMPOUNDS AND METHODS OF USE IN SUBTERRANEAN OPERATIONS

(71) Applicant: Halliburton Energy Services, Inc., Houston, TX (US)

(72) Inventors: Kenneth William Pober, Houston, TX (US); Jay Paul Deville, Spring, TX (US); William Walter Shumway, Spring, TX (US); Dale E. Jamison, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/541,093

(22) PCT Filed: Mar. 4, 2015

(86) PCT No.: PCT/US2015/018761
§ 371 (c)(1),
(2) Date: Jun. 30, 2017

(87) PCT Pub. No.: WO2016/140662
PCT Pub. Date: Sep. 9, 2016

(65) Prior Publication Data
US 2017/0369760 A1    Dec. 28, 2017

(51) Int. Cl.
*E21B 43/16* (2006.01)
*C09K 8/34* (2006.01)
(Continued)

(52) U.S. Cl.
CPC .................. *C09K 8/34* (2013.01); *C09K 8/36* (2013.01); *C09K 8/502* (2013.01); *C09K 8/565* (2013.01);
(Continued)

(58) Field of Classification Search
CPC .............. E21B 43/16; C09K 8/34; C09K 8/36
See application file for complete search history.

(56) References Cited

U.S. PATENT DOCUMENTS 4,350,605 A    9/1982    Hughett
4,382,868 A    5/1983    House
(Continued)

FOREIGN PATENT DOCUMENTS

CA    2451926 A1    6/2005
CA    2883564 A1    3/2014
(Continued)

OTHER PUBLICATIONS

International Preliminary Report on Patentability issued in related Application No. PCT/US2015/018761, dated Sep. 14, 2017 (11 pages).
(Continued)

*Primary Examiner* — Catherine Loikith
(74) *Attorney, Agent, or Firm* — Tenley Krueger; Baker Botts L.L.P.

(57) ABSTRACT

Certain invert emulsion treatment fluids and methods for use in subterranean formations Certain of those methods herein include: providing an invert emulsion treatment fluid that comprises an oleaginous external phase, and an internal phase that comprises one or more alcohols and one or more polar organic compounds that are soluble in the internal phase; and introducing the treatment fluid into at least a portion of a subterranean formation.

20 Claims, 1 Drawing Sheet

(51) Int. Cl.
*C09K 8/36* (2006.01)
*C09K 8/502* (2006.01)
*C09K 8/565* (2006.01)
*C09K 8/64* (2006.01)
*C09K 8/82* (2006.01)
*E21B 21/00* (2006.01)

(52) U.S. Cl.
CPC .................. *C09K 8/64* (2013.01); *C09K 8/82* (2013.01); *E21B 21/003* (2013.01)

(56) References Cited

U.S. PATENT DOCUMENTS

| | | | |
|---|---|---|---|
| 4,464,274 A | 8/1984 | House | |
| 5,072,794 A | 12/1991 | Hale et al. | |
| 5,494,120 A | 2/1996 | Hale et al. | |
| 6,838,082 B2 * | 1/2005 | Growcock | C05F 17/0009 424/93.7 |
| 7,939,470 B1 | 5/2011 | Wagle et al. | |
| 8,592,349 B2 * | 11/2013 | Tej | C09K 8/04 175/65 |
| 2013/0020081 A1 * | 1/2013 | Maghrabi | C09K 8/36 166/279 |
| 2013/0020083 A1 | 1/2013 | Wagle et al. | |
| 2014/0066338 A1 | 3/2014 | Wagle et al. | |
| 2017/0073566 A1 | 3/2017 | Pober | |

FOREIGN PATENT DOCUMENTS

| | | |
|---|---|---|
| EP | 0229912 A2 | 7/1987 |
| EP | 0652272 A1 | 5/1995 |
| WO | 2004069398 A2 | 8/2004 |
| WO | 2006008765 A1 | 1/2006 |
| WO | 2006/108122 A1 | 10/2006 |
| WO | 2013/012577 A1 | 1/2013 |
| WO | 2014/146991 A1 | 9/2014 |
| WO | 2015/187138 A1 | 12/2015 |

OTHER PUBLICATIONS

Office Action issued in related AU Application No. 2015384830, dated Sep. 19, 2017 (7 pages).
International Search Report and Written Opinion issued in related PCT Application No. PCT/US2015/018761 dated Sep. 22, 2015, 12 pages.
Examiner's Letter issued in related Canadian application No. 2,971,588 dated May 14, 2018, 4 pages.

* cited by examiner

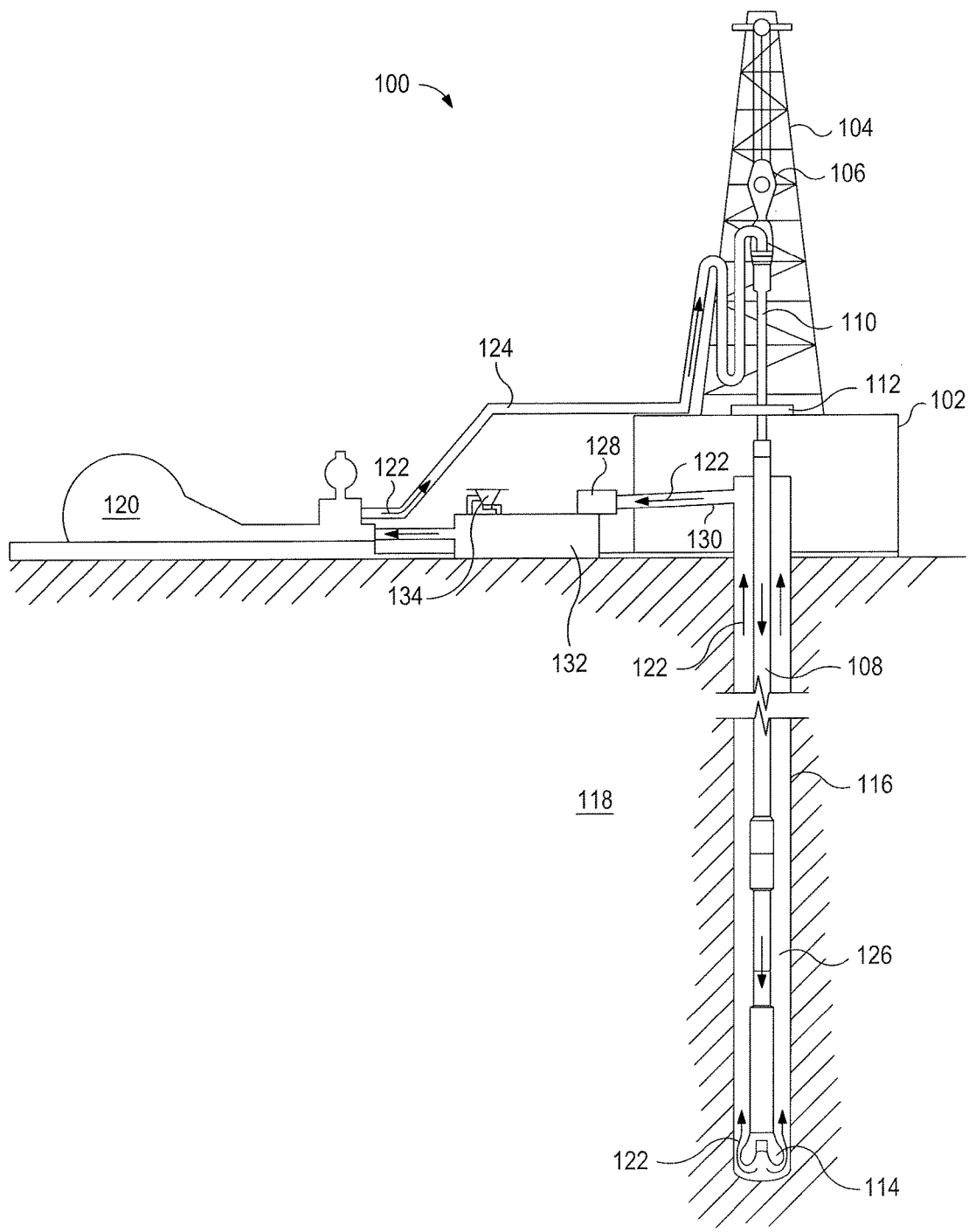

INVERT EMULSION TREATMENT FLUIDS COMPRISING POLAR ORGANIC COMPOUNDS AND METHODS OF USE IN SUBTERRANEAN OPERATIONS

CROSS-REFERENCE TO RELATED APPLICATION

The present application is a U.S. National Stage Application of International Application No. PCT/US2015/018761 filed Mar. 4, 2015, which is incorporated herein by reference in its entirety for all purposes.

BACKGROUND

The present disclosure relates to systems and methods for treating subterranean formations (e.g., drilling well bores in subterranean formations).

Treatment fluids can be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, fracturing operations, gravel packing operations, acidizing operations, scale dissolution and removal, consolidation operations, and the like.

For example, a drilling fluid, or "mud" which a drilling fluid is also often called, is a treatment fluid that is circulated in a well bore as the well bore is being drilled to facilitate the drilling operation. The various functions of a drilling fluid include removing drill cuttings from the well bore, cooling and lubricating the drill bit, aiding in support of the drill pipe and drill bit, and providing a hydrostatic head to maintain the integrity of the well bore walls and prevent well blowouts.

Specific drilling fluid systems are often selected to optimize a drilling operation in accordance with the characteristics of a particular geological formation. Some subterranean formations can be adversely affected by certain types of drilling fluids. One example of a formation that can be adversely affected by certain types of drilling fluids is a water-sensitive formation, such as a shale formation. Invert emulsion-based muds or drilling fluids (also called invert drilling muds or invert muds or fluids) are sometimes used in subterranean drilling operations, particularly where water-based fluids may be undesirable. However, they are increasingly subjected to greater environmental restrictions and performance and cost demands. The complexities and unpredictability of the interaction and behavior of the fluid components with each other and with the conditions encountered during drilling makes meeting these demands challenging.

BRIEF DESCRIPTION OF THE DRAWINGS

These drawings illustrate certain aspects of some of the embodiments of the present disclosure, and should not be used to limit or define the claims.

FIG. 1 is a diagram illustrating an example of a well bore drilling assembly that may be used in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure relates to systems and methods for treating subterranean formations (e.g., drilling well bores in subterranean formations). More particularly, the present disclosure relates to invert emulsion treatment fluids for use in subterranean formations.

The present disclosure provides improved treatment fluids comprising invert emulsions that may be used in a number of subterranean operations, including drilling operations. The treatment fluids of the present disclosure generally comprise an invert emulsion fluid that comprises an oleaginous external or continuous phase and an internal phase that comprises one or more alcohols and one or more polar organic compounds. In certain embodiments, the internal phase may consist solely of these components or may consist essentially of these components. In other embodiments, the internal phase may comprise some amount of an aqueous fluid such as water. Without limiting the disclosure to any particular theory or mechanism, it is believed that the polar organic compounds may be compatible with the alcohol and/or may match the water phase activity of an aqueous salt solution (e.g., a 250,000 parts per million calcium chloride solution). These and other properties may allow the invert emulsion fluids of the present disclosure to exhibit properties comparable to those of an invert emulsion comprising such a salt solution in the internal phase.

Among the many potential advantages to the methods and compositions of the present disclosure, only some of which are alluded to herein, the methods, compositions, and systems of the present disclosure may enhance one or more desirable properties of invert emulsion fluids including but not limited to stability, suitable sag factor, good rheology, low fluid loss into the subterranean formation, improved water phase activity, and/or a high shale retention value. In certain embodiments, the methods, compositions, and systems of the present disclosure may be particularly useful in water-sensitive subterranean formations, such as reactive shale formations. In certain embodiments, the invert emulsion fluids of the present disclosure may exhibit improved water phase activity as compared to, for example, invert emulsion fluids having an internal phase consisting only of alcohol and water, which may provide better shale stability than such fluids. In certain embodiments, the invert emulsion fluids of the present disclosure (or components thereof) may be more readily disposable and/or recyclable or may be more environmentally-friendly, at least in part due to a lack or reduction of the amount of salts therein. In certain embodiments, the use of polar organic compounds in the internal phase of the invert emulsions of the present disclosure may provide for greater variation in the design and/or use of the internal phase. For example, the use of these compounds may enhance the solubility of certain additives in the internal phase, or may alter properties of the internal phase (e.g., freezing point, boiling point, etc.) that enable its use in a broader set of environments and conditions.

The external or continuous phase of the invert emulsion treatment fluids of the present disclosure may comprise any oleaginous fluid known in the art. Examples of oleaginous fluids that may be suitable for use in the methods and systems of the present disclosure include, but are not limited to, oils, hydrocarbons, organic liquids, and the like. In certain embodiments, the external or continuous phase may comprise mineral oil based fluids or mineral oil/paraffin based fluids. Examples of commercially-available oleaginous fluids that may be suitable for use in the methods and systems of the present disclosure include, but are not limited to, those in ACCOLADE®, ENCORE®, INTEGRADE®, INNOVERT®, ENVIROMUL™, and PETROFREE® fluids, each of which is available from Halliburton Energy Services. Examples of commercially-available base oils for use in the fluids of the present disclosure include, but are not limited to ESCAID® 110 desulfurized hydrogenated kerosene oil base from ExxonMobil, USA in Houston, Tex. and ExxonMobil Chemical Company in Houston, Tex., XP-07™ (synthetic normal alkane fluid available from Halliburton Energy Services), and PUREDRILL™ drilling fluids (available from Petro-Canada). In another embodiment, the external or continuous phase of the invert emulsion fluids of the present disclosure may comprise a synthetic oil comprising an ester or olefin; a diesel oil; or a mineral oil selected from the group consisting of n-paraffins, iso-paraffins, cyclic alkanes, branched alkanes, or any mixture thereof.

The internal phase of the invert emulsion treatment fluids of the present disclosure generally comprises one or more alcohols, which may comprise any alcohol known in the art. Examples of alcohols that may be suitable in certain embodiments of the present disclosure include, but are not limited to, glycerols, polyglycerols, lower polyhydric alcohols, as well as any combination of alcohols. In certain embodiments, the internal phase of the invert emulsion fluids of the present disclosure may comprise at least about 20% by volume of the alcohol(s), and in some embodiments may comprise as much as about 90% by volume of the alcohol(s). In certain embodiments, the internal phase of the invert emulsion fluids of the present disclosure may comprise about 60% by volume of the alcohol(s).

The internal phase of the invert emulsion treatment fluids of the present disclosure also comprises one or more polar organic compounds, which may include any organic compound that is sufficiently polar to remain in the internal phase and is soluble in alcohol and/or an alcohol/water mixture. The polar organic compound(s) may be provided and/or combined with the alcohol in liquid and/or solid form. In certain embodiments, the polar organic compound(s) may be water soluble and/or may have low vapor pressures. In certain embodiments, the combination of the alcohol and the polar organic compound(s) may form a hygroscopic fluid. Examples of polar organic compounds that may be suitable for use in certain embodiments of the present disclosure include, but are not limited to, ethylene carbonate, propylene carbonate, ethylene glycol, propylene glycol, polyethylene glycol, polypropylene glycol, urea (monomeric), polyethylene oxide, polypropylene oxide, dimethyl formamide, dimethyl acetamide, n-methyl pyrrolidone, dimethyl sulfoxide, polyols, ethoxylated polyols, propoxylated polyols, polyamines, ethoxylated polyamines, propoxylated polyamines, morpholine, piperazine, dioxane, hexamethylphosphoramide (HMPA), glycine, aspartic acid, polyethylene imine, polyphosphazenes, sugars (e.g., glucose, fructose, mannitol, sucrose, and xylose), carboxylic acids (e.g., citric acid, tartaric acid, and malic acid), amino acids (e.g., glycine and alanine) and any combinations or mixtures thereof.

The internal phase may include the polar organic compounds (and the one or more alcohols) in any amount sufficient to provide the desired degree of water phase activity (e.g., the degree to which it will attract or retain water). For example, the internal phase may be formulated to provide a level of water phase activity equivalent to or greater than that of an aqueous calcium chloride solution having a calcium chloride concentration of from about 100,000 parts per million (ppm) to about 360,000 ppm. In certain embodiments, the one or more alcohols and the polar organic compounds are present in a total amount of at least about 30% by volume of the internal phase, or alternatively, of at least about 40% by volume of the internal phase. In certain embodiments, the internal phase of the invert emulsion fluids of the present disclosure may comprise at least about 0.01% by volume, or in some embodiments at least about 20% by volume, of the polar organic compounds. In certain embodiments, the one or more polar compounds may make up the balance of the internal phase in combination with the alcohol(s) present therein. For example, if the internal phase comprises about 60% of one or more alcohols by volume, the internal phase may comprise one or more polar organic compounds in a concentration of about 40% by volume. In certain embodiments, the internal phase may comprise the one or more polar organic compounds in a concentration of from about 0.01% to about 39.99% by volume.

In certain embodiments of the present disclosure, the internal phase may further comprise one or more aqueous fluids, in addition to the one or more polar organic compounds. Aqueous fluids that may be suitable for use in the methods and systems of the present disclosure may comprise water from any source. Such aqueous fluids may comprise fresh water, salt water (e.g., water containing one or more salts dissolved therein), brine (e.g., saturated salt water), seawater, or any combination thereof. In most embodiments of the present disclosure, the aqueous fluids comprise one or more ionic species, such as those formed by salts dissolved in water. For example, seawater and/or produced water may comprise a variety of divalent cationic species dissolved therein. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of viscosifying agents, acids, and other additives included in the fluid. One of ordinary skill in the art, with the benefit of this disclosure, will recognize when such density and/or pH adjustments are appropriate. In certain embodiments, one or more aqueous fluids may make up the balance of the internal phase in combination with the alcohol(s) and polar organic compounds present therein. In certain embodiments, the internal phase may comprise the aqueous fluid in an amount of at least about 0.01% by volume of the internal phase. In other embodiments, the internal phase may not include a significant amount of water. For example, the internal phase may comprise less than about 0.01% water by volume. In certain embodiments, the internal phase may comprise the aqueous fluid in an amount of less than about 40% by volume of the internal phase.

The invert emulsion treatment fluids of the present disclosure may comprise the internal and external phases as described above in any amounts and/or ratios that allows the formation of a stable invert emulsion. In certain embodiments, the internal and external phases may be present in an oil to water ratio of from about 98:2 to about 2:3. In certain embodiments, the internal and external phases may be present in an oil to water ratio of from about 19:1 to about 1:1. In certain embodiments, the internal and external phases may be present in an oil to water ratio of from about 9:1 to about 3:2. In certain embodiments, the internal and external phases may be present in an oil to water ratio of about 17:3. In certain embodiments, the internal phase can be present in the invert emulsion fluid in an amount of about 0.5% to about 60% by volume of the external phase. In certain embodiments, the internal phase can be present in the invert emulsion fluid in an amount of about 15% to about 45% by volume of the external phase.

In certain embodiments of the present disclosure, the internal phase may be "salt-free." As used herein, "salt-free" means without the addition of calcium chloride salts, or known substitutes such as potassium chloride, sodium chloride, magnesium sulfate, potassium acetate or formate. Nevertheless, such a "salt-free" fluid or internal phase of the present disclosure may be tolerant of such salts that may enter the fluids in insubstantial quantities, that is, in quantities less than about three pounds per barrel, as may occur, for example, in use in the field as when the fluid of the invention is mixed with recycled drilling fluids. In certain embodiments, the invert emulsions used in the methods and compositions of the present disclosure may be substantially "clay free", which means that they are made without addition of any organophilic clays or lignites to the invert emulsion.

In certain embodiments, substantially "salt-free" and/or "clay-free" drilling fluids that may be suitable for use in the method of the present disclosure may comprise an invert emulsion that comprises an oleaginous continuous phase (e.g., paraffin and/or mineral oil), an alcohol (e.g., a glycerol, polyglycerol, or combination thereof) in the internal phase, a quaternary ammonium emulsifier, and finely divided argillaceous solids. In certain embodiments, substantially "salt-free" and/or "clay-free" drilling fluids that may be suitable for use in the method of the present disclosure may comprise an invert emulsion that comprises an oleaginous continuous phase that comprises a hydrocarbon liquid, an internal phase that comprises a hygroscopic liquid, a polymeric suspending agent comprising urea linkages, and a particulate having a density of less than 3.5 g/cm$^3$. In certain embodiments, a test fluid consisting essentially of the continuous phase, the internal phase, the suspending agent, and the particulate referenced above, and in the same proportions as the drilling fluid, and after static aging for 2 months at a temperature of 200° F. (93.3° C.), may exhibit a 10-minute gel strength of at least 30 lb/100 ft2 (1,436 Pa) at a temperature of 120° F. (48.9° C.).

In certain embodiments, the treatment fluids used in the methods and systems of the present disclosure optionally may comprise any number of additional additives. Examples of such additional additives include, but are not limited to, surfactants, acids, particulates, diverting agents, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, flocculants, additional H$_2$S scavengers, CO$_2$ scavengers, oxygen scavengers, lubricants, additional viscosifiers, breakers, weighting agents, relative permeability modifiers, resins, wetting agents, coating enhancement agents, filter cake removal agents, antifreeze agents (e.g., ethylene glycol), and the like. In certain embodiments, one or more of these additional additives (e.g., a crosslinking agent) may be added to the treatment fluid and/or activated after the viscosifying agent has been at least partially hydrated in the fluid. A person skilled in the art, with the benefit of this disclosure, will recognize the types of additives that may be included in the fluids of the present disclosure for a particular application.

For example, in certain embodiments, the treatment fluids used in the methods and systems of the present disclosure optionally may comprise one or more polymeric suspending agents that comprise urea and/or one or more urea linkages. In some embodiments, a polymer comprising urea linkages may be formed from the combination of a compound containing two or more isocyanate functional groups and a compound containing two or more amine functional groups, and can be formed by: 1) polymerizing a first monomer of di-isocyanate and a second monomer of diamine; 2) forming a pre-polyisocyanate and then polymerizing the pre-polyisocyanate with a final monomer of diamine; 3) forming a pre-polyamine and then polymerizing the pre-polyamine with a monomer of di-isocyanate; or 4) forming a pre-polyisocyanate and a pre-polyamine and then polymerizing both of the pre-polymers. In certain embodiments, the polymer further comprises one or more urethane linkages. Any of the compounds containing the necessary functional group can be a monomer or part of a pre-polymer. Of course, the pre-polymer can include more than one of the necessary functional groups. Moreover, the polymer and any of the pre-polymers can be natural polymers or synthetic polymers, including resins. An example of a commercially-available polymer containing urea linkages (e.g., polyurea) is ADDITIN® M 10411, available from LANXESS India Private Limited, Business Unit-Rhein Chemie in Maharashtra, India. An example of a commercially-available polymer containing urea and urethane linkages (e.g., polyurea-urethane) is CRAYVALLAC LA-250, available from Cray Valley in Paris, France.

In certain embodiments, the treatment fluids used in the methods and systems of the present disclosure optionally may comprise an emulsifier. The emulsifier can be selected from the group consisting of tall oil-based fatty acid derivatives, vegetable oil-based derivatives, and combinations thereof. Commercially-available examples of emulsifiers that may be suitable for use include, but are not limited to, EZ MUL® NT, INVERMUL® NT, LE SUPERMUL®, and combinations thereof, available from Halliburton Energy Services, Inc. In certain embodiments, the emulsifier may be included in at least a sufficient concentration such that the drilling fluid maintains a stable invert emulsion. In certain embodiments, the emulsifier may be included in a concentration of at least 3 pounds per barrel (ppb) of the treatment fluid. In certain embodiments, the emulsifier may be included in a concentration of from about 3 ppb to about 20 ppb of the drilling fluid.

In certain embodiments, the treatment fluids used in the methods and systems of the present disclosure optionally may comprise an emulsifier activator, which may aid the emulsifier in creating a stable invert emulsion. The emulsifier activator can be a base, such as lime. In certain embodiments, the emulsifier activator may be present in a concentration of at least 0.5 ppb of the treatment fluid. In certain embodiments, the emulsifier activator may be present in a concentration of from about 0.5 to about 3 ppb of the treatment fluid.

The present disclosure in some embodiments provides methods for using the treatment fluids to carry out a variety of subterranean treatments, including but not limited to, drilling operations, completions operations, workover treatments, and the like. In some embodiments, the treatment fluids of the present disclosure may be used in treating a portion of a subterranean formation, for example, in drilling operations. In certain embodiments, a treatment fluid may be introduced into a subterranean formation. In some embodiments, the treatment fluid may be introduced into a well bore that penetrates a subterranean formation. In some embodiments, the treatment fluid may be introduced while drilling at least a portion of a well bore to penetrate at least a portion of a subterranean formation.

The methods and compositions of the present disclosure may be used during or in conjunction with any subterranean drilling operation where an oil-based drilling mud or an invert emulsion drilling mud is used. For example, the methods and/or compositions of the present disclosure may be used in the course of drilling operations in which a well bore has been drilled to penetrate a subterranean formation. In certain embodiments, this may be accomplished using the pumping system and equipment used to circulate the drilling fluid in the well bore during the drilling operation, which is described below. The treatment fluids of the present disclosure may be introduced into the well bore using any method or equipment known in the art. In certain embodiments, a drilling fluid of the present disclosure may be circulated in the well bore using the same types of pumping systems and equipment at the surface that are used to introduce drilling fluids into a well bore penetrating at least a portion of the subterranean formation.

The drilling fluid(s) of the present disclosure herein may directly or indirectly affect one or more components or pieces of equipment associated with the preparation, delivery, recapture, recycling, reuse, and/or disposal of the drilling fluid(s) of the present disclosure. For example, and with reference to FIG. 1, the drilling fluid(s) of the present disclosure may directly or indirectly affect one or more components or pieces of equipment associated with a wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure.

One or more additives (e.g., polar organic compounds, etc.) may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the drilling fluid(s) of the present disclosure may be added to the drilling fluid 122 at any other location in the drilling assembly 100. In at least one embodiment, for example, there could be more than one retention pit 132, such as multiple retention pits 132 in series. Moreover, the retention put 132 may be representative of one or more fluid storage facilities and/or units where the drilling fluid(s) of the present disclosure may be stored, reconditioned, and/or regulated until added to the drilling fluid 122.

As mentioned above, the drilling fluid(s) of the present disclosure may directly or indirectly affect the components and equipment of the drilling assembly 100. For example, the drilling fluid(s) of the present disclosure may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment, etc. For example, in certain embodiments, one or more of these types of equipment in fluid processing unit(s) 128 may be used to remove cuttings from the used drilling fluid so that the cleaned drilling fluid may be re-used. Because certain embodiments of the drilling fluids of the present disclosure may be "salt-free" and/or "clay-free", the cleaning of a used drilling fluid using fluid processing unit(s) 128 may be simplified. The fluid processing unit(s) 128 may further include one or more sensors, gauges, pumps, compressors, and the like used store, monitor, regulate, and/or recondition the drilling fluid(s) of the present disclosure.

The drilling fluid(s) of the present disclosure may directly or indirectly affect the pump 120, which representatively includes any conduits, pipelines, trucks, tubulars, and/or pipes used to fluidically convey the drilling fluid(s) of the present disclosure downhole, any pumps, compressors, or motors (e.g., topside or downhole) used to drive the drilling fluid(s) of the present disclosure into motion, any valves or related joints used to regulate the pressure or flow rate of the drilling fluid(s) of the present disclosure, and any sensors (i.e., pressure, temperature, flow rate, etc.), gauges, and/or combinations thereof, and the like. The drilling fluid(s) of the present disclosure may also directly or indirectly affect the mixing hopper 134 and the retention pit 132 and their assorted variations.

The drilling fluid(s) of the present disclosure may also directly or indirectly affect the various downhole equipment and tools that may come into contact with the drilling fluid(s) of the present disclosure such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The drilling fluid(s) of the present disclosure may also directly or indirectly affect any downhole heat exchangers, valves and corresponding actuation devices, tool seals, packers and other wellbore isolation devices or components, and the like associated with the wellbore 116.

The drilling fluid(s) of the present disclosure may also directly or indirectly affect the drill bit 114, which may include, but is not limited to, roller cone bits, PDC bits, natural diamond bits, any hole openers, reamers, coring bits, etc.

While not specifically illustrated herein, the drilling fluid(s) of the present disclosure may also directly or indirectly affect any transport or delivery equipment used to convey the drilling fluid(s) of the present disclosure to the drilling assembly 100 such as, for example, any transport vessels, conduits, pipelines, trucks, tubulars, and/or pipes used to fluidically move the drilling fluid(s) of the present disclosure from one location to another, any pumps, compressors, or motors used to drive the drilling fluid(s) of the present disclosure into motion, any valves or related joints used to regulate the pressure or flow rate of the drilling fluid(s) of the present disclosure, and any sensors (i.e., pressure and temperature), gauges, and/or combinations thereof, and the like.

In certain embodiments, the invert emulsion drilling fluids of the present disclosure may be used to more effectively drill in salt formations such as salt domes or salt stringers or other formations comprising calcium sulfates, calcium carbonates, and/or anhydrides. The salts in these formations may be less soluble in drilling fluids of the present disclosure (as compared to certain conventional drilling fluids), and thus may not affect the weight, osmotic pressure, and/or internal phase activity of the drilling fluid.

An embodiment of the present disclosure is a method comprising: providing an invert emulsion treatment fluid that comprises an oleaginous external phase, and an internal phase that comprises one or more alcohols and one or more polar organic compounds that are soluble in the internal phase; and introducing the treatment fluid into at least a portion of a subterranean formation.

Another embodiment of the present disclosure is a system comprising: providing an invert emulsion drilling fluid that comprises an oleaginous external phase, and an internal phase that comprises one or more alcohols and one or more polar organic compounds that are soluble in the internal phase; and using the drilling fluid to drill at least a portion of a well bore penetrating at least a portion of a subterranean formation.

Another embodiment of the present disclosure may include a method according to any of the preceding embodiments wherein the portion of the subterranean formation comprises a salt formation.

Another embodiment of the present disclosure may include a method according to any of the preceding embodiments further comprising introducing the treatment fluid or drilling fluid into the well bore using one or more pumps and a drillstring.

Another embodiment of the present disclosure may include a method according to any of the preceding embodiments further comprising: circulating the treatment fluid or drilling fluid out of the well bore after using the treatment fluid or drilling fluid; and removing cuttings from the treatment fluid or drilling fluid using a fluid processing device.

Another embodiment of the present disclosure is an invert emulsion treatment fluid comprising: an oleaginous external phase; and an internal phase that comprises one or more alcohols and one or more polar organic compounds that are soluble in the internal phase.

Another embodiment of the present disclosure may include a method or invert emulsion treatment fluid according to any of the preceding embodiments wherein the one or more alcohols and the polar organic compounds are present in a total amount of at least about 30% by volume of the internal phase.

Another embodiment of the present disclosure may include a method or invert emulsion treatment fluid according to any of the preceding embodiments wherein the one or more alcohols and the polar organic compounds are present in a total amount of at least about 40% by volume of the internal phase.

Another embodiment of the present disclosure may include a method or invert emulsion treatment fluid according to any of the preceding embodiments wherein the treatment fluid further comprises a polymeric suspending agent that comprises one or more urea linkages.

Another embodiment of the present disclosure may include a method or invert emulsion treatment fluid according to any of the preceding embodiments wherein the internal phase consists essentially of the one or more alcohols and the one or more polar organic compounds.

Another embodiment of the present disclosure may include a method or invert emulsion treatment fluid according to any of the preceding embodiments wherein the internal phase does not include a significant amount of water.

Another embodiment of the present disclosure may include a method or invert emulsion treatment fluid according to any of the preceding embodiments wherein the one or more alcohols are selected from the group consisting of: a glycerol, a polyglycerol, and any combination thereof.

Another embodiment of the present disclosure may include a method or invert emulsion treatment fluid according to any of the preceding embodiments wherein the internal phase has a water phase activity equivalent to or greater than that of an aqueous calcium chloride solution having a calcium chloride concentration of from about 100,000 ppm to about 360,000 ppm.

Another embodiment of the present disclosure may include a method or invert emulsion treatment fluid according to any of the preceding embodiments wherein the one or more polar organic compounds comprise at least one compound selected from the group consisting of: ethylene carbonate, propylene carbonate, ethylene glycol, propylene glycol, polyethylene glycol, polypropylene glycol, urea (monomeric), polyethylene oxide, polypropylene oxide, dimethyl formamide, dimethyl acetamide, n-methyl pyrrolidone, dimethyl sulfoxide, a polyol, an ethoxylated polyol, a propoxylated polyol, a polyamine, an ethoxylated polyamine, a propoxylated polyamine, morpholine, piperazine, dioxane, hexamethyiphosphoramide (RMPA), glycine, aspartic acid, polyethylene imine, a polyphosphazene, a sugar, a carboxylic acid, an amino acid, and any combination thereof.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
providing an invert emulsion treatment fluid that comprises
an oleaginous external phase, and
an internal phase that comprises
a first component that comprises one or more alcohols, and
a second component that comprises one or more polar organic compounds that are soluble in the internal phase, the one or more polar organic compounds selected from the group consisting of urea (monomeric), polyethylene oxide, polypropylene oxide, dimethyl formamide, dimethyl acetamide, n-methyl pyrrolidone, dimethyl sulfoxide, a polyamine, an ethoxylated polyamine, a propoxylated polyamine, morpholine, piperazine, dioxane, hexamethylphosphoramide (HMPA), glycine, aspartic acid, polyethylene imine, a polyphosphazene, a sugar, a carboxylic acid, an amino acid, and any combination thereof; and
introducing the treatment fluid into at least a portion of a subterranean formation.

2. The method of claim 1 wherein the alcohols and the polar organic compounds are present in a total amount of at least about 40% by volume of the internal phase.

3. The method of claim 1 wherein the treatment fluid further comprises a polymeric suspending agent that comprises one or more urea linkages.

4. The method of claim 1 wherein the internal phase consists essentially of the one or more alcohols and the one or more polar organic compounds.

5. The method of claim 1 wherein the internal phase does not include a significant amount of water.

6. The method of claim 1 wherein the one or more alcohols are selected from the group consisting of: a glycerol, a polyglycerol, and any combination thereof.

7. The method of claim 1 wherein the internal phase has a water phase activity equivalent to or greater than that of an aqueous calcium chloride solution having a calcium chloride concentration of from about 100,000 ppm to about 360,000 ppm.

8. The method of claim 1 wherein the internal phase of the invert emulsion treatment fluid is salt-free.

9. A method comprising:
providing an invert emulsion drilling fluid that comprises
an oleaginous external phase, and
an internal phase that comprises
a first component that comprises one or more alcohols, and
a second component that comprises one or more polar organic compounds that are soluble in the internal phase, the one or more polar organic compounds selected from the group consisting of urea (monomeric), polyethylene oxide, polypropylene oxide, dimethyl formamide, dimethyl acetamide, n-methyl pyrrolidone, dimethyl sulfoxide, a polyamine, an ethoxylated polyamine, a propoxylated polyamine, morpholine, piperazine, dioxane, hexamethylphosphoramide (HMPA), glycine, aspartic acid, polyethylene imine, a polyphosphazene, a sugar, a carboxylic acid, an amino acid, and any combination thereof; and
using the drilling fluid to drill at least a portion of a well bore penetrating at least a portion of a subterranean formation.

10. The method of claim 9 further comprising introducing the drilling fluid into the well bore using one or more pumps and a drillstring.

11. The method of claim 9 further comprising:
circulating the drilling fluid out of the well bore after using the drilling fluid; and
removing cuttings from the drilling fluid using a fluid processing device.

12. The method of claim 9 wherein the one or more alcohols are selected from the group consisting of: a glycerol, a polyglycerol, and any combination thereof.

13. The method of claim 9 wherein the alcohols and the polar organic compounds are present in a total amount of at least about 30% by volume of the internal phase.

14. The method of claim 9 wherein the internal phase does not include a significant amount of water.

15. The method of claim 9 wherein the portion of the subterranean formation comprises a salt formation.

16. The method of claim 9 wherein the internal phase of the invert emulsion drilling fluid is salt-free.

17. An invert emulsion treatment fluid comprising:
an oleaginous external phase; and
an internal phase that comprises
a first component that comprises one or more alcohols, and
a second component that comprises one or more polar organic compounds that are soluble in the internal phase, the one or more polar organic compounds selected from the group consisting of urea (monomeric), polyethylene oxide, polypropylene oxide, dimethyl formamide, dimethyl acetamide, n-methyl pyrrolidone, dimethyl sulfoxide, a polyamine, an ethoxylated polyamine, a propoxylated polyamine, morpholine, piperazine, dioxane, hexamethylphosphoramide (HMPA), glycine, aspartic acid, polyethylene imine, a polyphosphazene, a sugar, a carboxylic acid, an amino acid, and any combination thereof.

18. The invert emulsion treatment fluid of claim 17 wherein the alcohols and the polar organic compounds are present in a total amount of at least about 30% by volume of the internal phase.

19. The invert emulsion treatment fluid of claim 17 wherein the internal phase does not include a significant amount of water.

20. The invert emulsion treatment fluid of claim 17 wherein the internal phase is salt-free.

* * * * *